(12) United States Patent
Prodanov et al.

(10) Patent No.: US 11,441,074 B2
(45) Date of Patent: Sep. 13, 2022

(54) LIGAND, NANOPARTICLE, AND THIN FILM WITH THE SAME

(71) Applicant: The Hong Kong University of Science and Technology, Kowloon (CN)

(72) Inventors: Maksym Fedorovich Prodanov, Kharkov (UA); Valerii Vladimirovich Vashchenko, Kharkov (UA); Abhishek Kumar Srivastava, Hong Kong (CN); Swadesh Kumar Gupta, Delhi (IN); Chengbin Kang, Nanjing (CN); Maksym Diakov, Kharkov (UA)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 18 days.

(21) Appl. No.: 16/987,822

(22) Filed: Aug. 7, 2020

(65) Prior Publication Data

US 2021/0040389 A1    Feb. 11, 2021

Related U.S. Application Data

(60) Provisional application No. 62/922,374, filed on Aug. 8, 2019.

(51) Int. Cl.
| | |
|---|---|
| C09K 19/38 | (2006.01) |
| C09K 19/56 | (2006.01) |
| C09K 11/88 | (2006.01) |
| C09K 11/02 | (2006.01) |
| G02B 5/30 | (2006.01) |
| C09K 19/52 | (2006.01) |

(52) U.S. Cl.
CPC ........ *C09K 19/3852* (2013.01); *C09K 11/025* (2013.01); *C09K 11/883* (2013.01); *C09K 19/56* (2013.01); *C09K 2019/521* (2013.01); *G02B 5/3016* (2013.01)

(58) Field of Classification Search
CPC ..................................... C09K 11/02
See application file for complete search history.

(56) References Cited

U.S. PATENT DOCUMENTS

| | | |
|---|---|---|
| 5,505,928 A | 4/1996 | Alivisatos et al. |
| 5,537,000 A | 7/1996 | Alivisatos et al. |
| 5,751,018 A | 5/1998 | Alivisatos et al. |

(Continued)

FOREIGN PATENT DOCUMENTS

KR    1020150061918 A    6/2015

OTHER PUBLICATIONS

Amit, Yorai et al., "Semiconductor nanorod layers aligned through mechanical rubbing", *Phys Status Solidi A*, 209, No. 2, pp. 235-242, (2012).

(Continued)

*Primary Examiner* — Chanceity N Robinson
(74) *Attorney, Agent, or Firm* — Leydig, Voit & Mayer, Ltd.

(57) ABSTRACT

A nanoparticle film is disclosed. The nanoparticle film comprises a plurality of polymerized liquid crystal monomers having an axis of alignment, and a plurality of nanoparticles disposed in the polymerized liquid crystal monomers. Each of the nanoparticles has a surface modified by a plurality of first ligands and a long axis aligned with the axis of alignment through the plurality of first ligands.

20 Claims, 11 Drawing Sheets

(56) References Cited

U.S. PATENT DOCUMENTS

| | | | |
|---|---|---|---|
| 5,990,479 | A | 11/1999 | Weiss et al. |
| 6,207,229 | B1 | 3/2001 | Bawendi et al. |
| 6,907,062 | B2 | 6/2005 | Carlson |
| 10,948,774 | B2 | 3/2021 | Srivastava et al. |
| 2014/0319563 | A1 | 10/2014 | Cao et al. |
| 2016/0187730 | A1 | 6/2016 | Du et al. |
| 2018/0312748 | A1* | 11/2018 | Lan .................. C09K 11/08 |
| 2019/0312175 | A1 | 10/2019 | Prodanov et al. |
| 2019/0382655 | A1* | 12/2019 | Kuwana ............ C09K 11/08 |
| 2021/0108142 | A1* | 4/2021 | Endou ............... C09K 19/02 |

OTHER PUBLICATIONS

Aubert, Tangi, et al. "Large-Scale and Electroswitchable Polarized Emission from Semiconductor Nanorods Aligned in Polymeric Nanofibers", *ACS Photonics*, 2, pp. 583-588, (2015).
Baker, Jessy, L., et al., "Device-Scale Perpendicular Alignment of Colloidal Nanorods", *Nano Lett.* 10, pp. 195-201, (2009).
Crooker, S.A, et al. "Spectrally Resolved Dynamic of Energy Transfer in Quantum-Dot Assemblies: Towards Engineered Energy Flows in Artificial Materials" *Physical Review Letters*, vol. 89, No. 18., pp. 186802-1-186802-4, (2002).
Cunningham, Patrick, D., et al., "Assessment of Anisotropic Semiconductor Nanorod and Nanoplatelet Heterostructures with Polarized Emission for Liquid Crystal Display Technology", *ACS Nano*, 10, pp. 5769-5781. (2016).
Cseh, Liliana, et al., "The Design and Investigation of Room Temperature Thermotropic Nematic Gold Nanoparticles", *Journal of the American Chemical Society*, 128, pp. 13376-13377, (2006).
Cseh, Liliana, et al., "Structure-property relationships in nematic gold nanoparticles", *Journal of Materials Chemistry*, 17, pp. 311-315, (2007).
Du, Tao, et al., "Combination of Photoinduced Alignment and Self-Assembly to Realize Polarized Emission from Ordered Semiconductor Nanorods", *ACS Nano*, vol. 9, No. 11, pp. 11049-11055, (2015).
Hasegawa, Masaki, et al. "Polarized fluorescent emission from aligned electrospun nanofiber sheets containing semiconductor nanorods", *Appl Phys Lett*, 106, pp. 051103-1-051103-6 (2015).
Hu, Zonghai, et al., "Electric-Field-Driven Accumulation and Alignment of CdSe and CdTe Nanorods in Nanoscale Devices", *Nano Letters*, vol. 6, No. 11, pp. 2585-2591, (2006).
Kagan, C.R., et al., "Electronic Energy in CdSe Quantum Dot Solids", *Physical Review Letters*, vol. 76, No. 9, pp. 1517-1520, (Feb. 26, 1996).
Koole, Rolf, et al., "Electric Coupling and Exciton Energy Transfer in CdTe Quantum-Dot Molecules", *J. Am. Chem. Soc.*, 128, pp. 10436-10441, (2006).
Li, Liang-Shi, et al. "Semiconductor Nanorod Liquid Crystals and Their Assembly on a Substrate" *Advanced Materials* 15, No. 5, pp. 408-411, (Mar. 4, 2003).
Lutich, A., et al. "Macroscale alignment of CdSe/CdS nanorods by porous anodic alumina templates", *Phys. Status Solidi* RRL3, No. 5, pp. 151-153, (2009).
Matvienko, Oksana O., et al., "Impact of dendritic interface modifiers on phase behavior of polyvinylcarbazol-CdSe/ZnS nanocomposite films", *Colloid. Polym Sci.*, 292, pp. 707-713, (2014).
Noh, Minho, et al., "Fluorescence quenching caused by aggregation of water-soluble CdSe quantum dots", *Colloids and Surfaces A:Physicochemical and Engineering Aspects*, 359, pp. 39-44, (2010).
Prodanov, Malsym F., et al.,, "Thermodynamically Stable Dispersions of Quantum Dots Nematic Liquid Crystal", *Langmuir*, 29 (30), pp. 9301-9309, (2013).
Prodanov, Maksym F., et al. "Dispersion of magnetic nanoparticles in a polymorphic liquid crystal", *Liquid Crystals*, vol. 39, No. 12, pp. 1512-1526, (Dec. 2012).
Prodanov, Maksym F., et al. "Magnetic actuation of a thermodynamically stable colloid of ferromagnetic nanoparticles in a liquid crystal", *Soft Matter*, 12, pp. 6601-6609; (2016).

Sapsford, Kim. E., et al., "Materials for Fluorescence Resonance Energy Transfer Analysis: Beyond Traditional Donor-Acceptor Combinations", *Angew Chem Int. Ed.*, 45, pp. 4562-4588, (2006).
Schafer, Stefan., et al., "Self-alignment of zinc oxide nanords into a 3D-smectic Phase", *Thin Solid Films*, 562, pp. 659-667, (2014).
Schneider, Julian, et al. "Photoinduced Micropattern Alignment of Semiconductor Nanorods with Polarized Emission in a Liquid Crystal Polymer Matrix", *Nano Letters* 17, pp. 3133-3138, (2017).
Umadevi, S., "Large Area Self-Assembly of Nematic Liquid-Crystal-Functionalized Gold Nanorods", *Adv. Fund. Mater*, 23, pp. 1393-1403, (2013).
Wang, Mingsheng, et al., "Magnetically Actuated Liquid Crystals", *Nano Letters*, 14, pp. 3966-3971, (2014).
Wang, Tie, et al., "Self-Assembled Colloidal Superparticles from Nanorods", *Science*, 388, pp. 358-363, (2012).
Zhang, Wanlong, et al., "Ligand Shell Engineering to Achieve Optimal Photoalignment of Semiconductor Quantum Rods for Liquid Crystal Displays", *Adv. Funct. Mater*, 1805094, pp. 1-7, (2018).
Zhang, Yu, et al., "pH dependent aggregation and photoluminescence behavior of thiol-capped CdTe quantum dots in aqueous solutions", *Journal of Luminescence*, 128, pp. 1948-1951, (2008).
Carbone, Luigi, "Synthesis and Micrometer-Scale Assembly of Colloidal CsSe/CdS Nanorods Prepared by Seeded Growth Approach", *Nano Letters*, vol. 7(10), pp. 2942-2950, (2007).
Yan, Jin, et al., "Polymer stabilized optically-isotroplc liquid crystals for next-generation display and photonics applications", *J. Mater. Chem.* 21, pp. 7870-7877, (2011).
Thomas, N., Le et al., "Exciton Fine Structure in Single CdSe Nanorods", *Physical Review Letters*, 94, 016803-1 (Jan. 14, 2005).
Shirasaki, Yasuhiro, et al., "Emergence of colloidal quantum-dot light emitting technologies", *Nature Photonics* 7, pp. 13-23, (2013).
Chen, Jian, "Quatum-Dot Displays Giving LCDs a Competitive Edge Through Color", *SID Information Display*, pp. 2-7, (2013).
Luo, Zhenyue, et al. "Wide-color gamut LCD with a quantum dot backlight", *Opt Express*, 21(22), pp. 26269-26284, (2013).
Doornbos, T., et al., "The Complete N-Alkylation of 1,4-Diamino-2,5-Dibromobenzene and of 1,4-Diamino-2,5-Dimethoxybenzen", *Organic Preparations and Procedures*, 1(4):287-303 (1969).
Srivastava, A.K., et al.. "Luminescent Down-Conversion Semiconductor Quantum Dots and Aligned Quantum Rods for Liquid Crystal Displays", *Advanced Science*, 6, 1901345, pp. 1-20, (2019).
Dudka, Tetiana, et al. Formulation of a Composite System of Liquid Crystals and Light-Emitting Semiconductor Quantum Rods: From Assemblies in Solution to Photoaligned Films, *Advanced Materials Technologies*, vol. 4, Issue II, 1900695, (Nov. 2019).
Rizzo, Aurora, et al., "Polarized Light Emitting Diode by Long-Range Assembling on a Water Surface", *ACS Nano*, 3(6), pp. 1506-1512. (2009).
Persano, Anna, et al., "Photoconduction Properties in Aligned Assemblies of Colloidal CdSe/CdS Nanorods", *ACS Nano*. 4(3), pp. 1646-1652, (2010).
Ahmed, W., et al., "Quantitative Analysis of Gold Nanorod Alignment after Electric Field-Assisted Deposition", *Nano Lett*. 9(11), pp. 3786-3794, (2009).
Gupta, Swadesh, et al., "Inkjet-printed aligned quantum rod enhancement films for their application in liquid crystal displays", *Nanoscale*, 2019, 11, 20837-20846.
Lu, R., et al., "LED-lit LCD TVs", *Molecular Crystal Liquid Crystals*., 488(1), pp. 246-259, (2008).
Liu, Guanqshenq, et al., "Enhanced photoluminescence of Sm3+/Bi3+ co-doped Gd2O3 phosphors by combustion synthesis", *Journal of Luminescence*, vol. 128(12), pp. 2008-2012, (2008).
Kim. F., et al., "Langmuir-Blodgett, Nanorod Assembly", *Journal of the American Chemical Society*, 123, pp. 4360-4361, (2001).
Zhang, Wanlong, et al.. "Optically Addressable Photoaligned Semiconductor Nanorods in Thin Liquid Crystals Films for Display Applications", *Advanced Optical Materials*, vol. 6, issue 16, 1800250, (Aug. 20, 2018).
Srivastava, A.K., et al.. "Photoaligned Nanorod Enhancement Films with Polarized Emission for Liquid-Crystal-Display Applications", *Advanced Materials*, vol., 29, Issue 33, 1701091, (Sep. 6, 2017).

(56) References Cited

OTHER PUBLICATIONS

Mohammadimasoud I, M., et al. "Fast and versatile deposition of aligned semiconductor nanorods by dip-coating on a substracte with interdigitated electrodes", *Optical Materials Express, OMEX*, 3(12), 2046, 10 pages total, (Dec. 1, 2013).

* cited by examiner

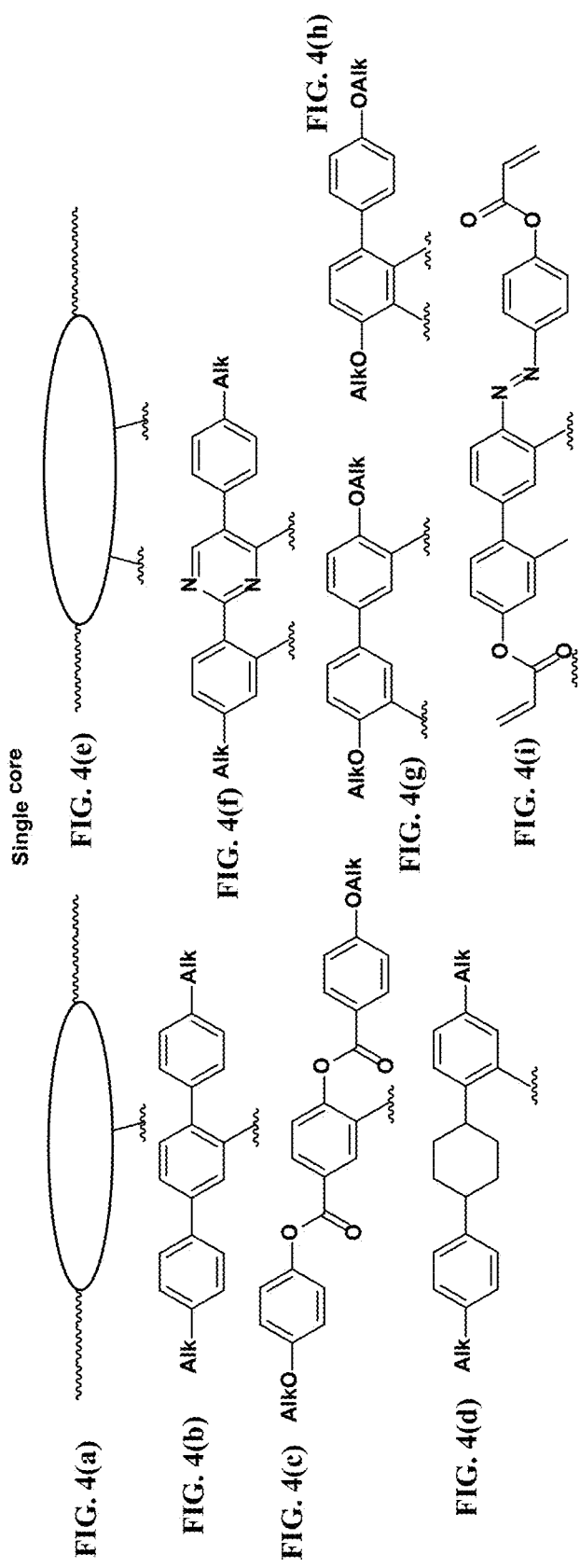

LIGAND, NANOPARTICLE, AND THIN FILM WITH THE SAME

CROSS-REFERENCE TO RELATED APPLICATIONS

This patent application claims the benefit of U.S. Provisional Patent Application No. 62/922,374, filed Aug. 8, 2019, which is incorporated herein by reference in its entirety.

BACKGROUND

Nanostructured materials including colloidal semiconductor nanocrystals offer a low-cost solution for various applications in photonics such as photovoltaic and thin-film devices, sources of polarized light, light-emitting diodes, among others. Controlling the orientation of elongated nanoparticles ("NPs"), such as nanorods ("NRs"), in a device is desired. In particular, the anisotropic absorption and the spontaneous and stimulated emission from an aligned quantum rods ("QRs") is attractive for many applications such as light-emitting devices, solar cells, and displays, etc. The quantum dot enhancement films ("QDEF") have become very popular in modern liquid crystal displays ("LCDs") that offer an extended color gamut over 100% of the color triangle defined by the National Television System Committee ("NTSC"). However, LCDs still suffer from low efficiency, because of the polarizers and color filters. A linear polarizer placed between the backlight and a LCD panel absorbs more than 55% of the light. Therefore, the overall efficiency of modern LCDs is limited to 3-5%. The quantum rod brightness enhancement film ("QREF"), in comparison to QDEF, provides additional significant advantages such as emission of linearly polarized light and enhanced light out-coupling. Thus, QREF can not only increase the color gamut of LCDs, but also considerably improve the overall efficiency of LCDs. Since nanorods also have unique anisotropy in other physical properties (e.g., thermal, electrical conductivity, and surface energy) and exhibit anisotropic absorption because of their one-dimensional shape, they can be used in many other applications. Thus, the alignment of nanorods or quantum rods in thin films is highly desired.

It has been shown that optimization of the interactions between an organic host and nanoparticles surface ligands is a practical method for preparation of uniform hybrid nanomaterials. In case of liquid crystal ("LC") polymers as organic media (i.e., host), minimization of the LC distortion is achieved by preparation of the ligand shell structure that provides (i) effective penetration of the LC host molecules into the ligand layer and (ii) effective interaction between the LC host and the ligand molecules, which results in adjustment of ligand ordering to match the ordering of the surrounding LC. The use of promesogenic dendritic ligands, as a main surfactant, in combination with a proportion of short-tail co-ligand applied to nanoparticle surface, as shown in FIG. 1, provides good stabilizing effects and results in homogeneous distribution of QRs within the polymer film and significant increase of the QREF brightness. However, although the ligands expand the applicable concentration range of nanorods in the prior-art polymer films, in contrast to "native" alkyl surfactants, nevertheless, polarization ratio ("PR") is strongly suppressed in these prior-art polymer films upon increase of QRs concentration as shown in FIG. 1.

It has further been shown that at a low concentration of nanorods in a nanoparticle film, a main aligning factor of nanorods may be a surface interaction between the nanorods and a liquid crystal monomer ("LCM") of the nanoparticle film. In such a case, the nanorods may be aligned with the LCM efficiently. In contrast, at a higher concentration of nanorods, the interaction of nanorods with the LCM becomes competitive. Therefore, when the content of NR is high enough, it results in an uncertainty of the alignment for both components (i.e., the NRs and the LCM) of the film, causing a decrease in the polarization ratio of the film.

SUMMARY

According to an embodiment, a nanoparticle material is disclosed herein. The nanoparticle material may include nanoparticles, such as nanorods, modified with ligands that are designed to induce an alignment of the nanorods in parallel with an axis of surrounding organic media. The organic media may be an LCP host. The axis of the surrounding organic media may be an optical axis or an easy axis of the LCP. Alternatively, the axis of the organic media may be a director of the LCP or a polymer chain of simple aligned linear polymers.

The material disclosed herein is characterized by a high concentration of nanorods within the film without aggregation, while retaining a high order of alignment. Hence, the material disclosed herein may reduce dependence of film brightness and polarization ratio on the NR concentration of the film. At the same time, the ligand disclosed herein may be applied to any type of elongated nanoparticles for designs of novel functional nanomaterials.

According to an embodiment, a nanoparticle film is disclosed, comprising a host and nanoparticles of an elongated shape in the host. The nanoparticles are aligned so that their long axes are parallel with a direction of the host. The nanoparticles are surface modified with organic ligands. The host may include structurally anisotropic organic media having an optical axis. The ligands disposed on the surfaces of the nanoparticles may align the elongated nanoparticles so that their long axes are parallel to the optical axis of the structurally anisotropic organic media.

According to an alternative embodiment, a nanoparticle film is disclosed. The nanoparticle film may include a plurality of polymerized liquid crystal monomers aligned with an axis of alignment and a plurality of nanoparticles disposed in the polymerized liquid crystal monomers. Each of the nanoparticles may have a surface modified by a plurality of first ligands and a long axis aligned with the axis of alignment through the plurality of first ligands. A concentration of the nanoparticles in the film may be in the range of 0.5 to 50 wt. %.

The first ligand may include a main core of an elongated shape, a first anchoring group, and a spacer. The first anchoring group may be connected to a lateral position of the main core. The main core may include at least one ring, which may be selected from a group of an aromatic ring, a heteroaromatic ring, 1,4-cyclohexylidene ring, 1,4-cyclohexenylidene ring, 1,3-dioxolane ring, or a polycyclic fragment.

According to a further embodiment, the at least one ring may include a plurality of rings connected in a linear structure through one or more bridge groups. Each of the one or more bridge groups may be selected from a group of an —O— atom, an —S— atom, a ketone group, an ester group, a —C(O)CH$_2$COO— group, an azo-group, or an ethylene group, an acetylenene group, a —CX$_2$CH$_2$COO— group, wherein X is an H or halogen atom, a —(CH$_2$)$_m$— or —(OCH$_2$)$_m$— group, wherein m is greater than or equal to 1 and smaller than or equal to 11.

The spacer may be selected from a group of n-alkylene, alkenylene, and branched alkylene including chiral groups. The first anchoring group may be selected from one of a group of a phosphonic group, a salt of the phosphonic group, a phosphate group, a salt of the phosphate group, a phosphinic group, a salt of the phosphinic group, a carboxylic group, a salt of the carboxylic group, a sulfonic group, a salt of the sulfonic group, a sulfinic group, a salt of the sulfinic group, a thiol group, an amino group, a nitro group, a hydroxyl group, a Si(OH)$_3$ group, and an —OSi(OH)$_3$ group. The first ligand may further comprise a second anchoring group connected to another position of the main core.

According to an embodiment, the first ligand may have a structural fragment according to a formula of:

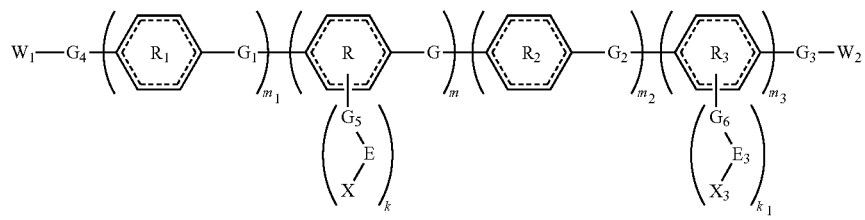

Each of R, R$_1$, R$_2$ and R$_3$ is selected from a group of an aromatic ring, a heteroaromatic ring, a 1,4-cyclohexylidene ring, a 1,4-cyclohexenylidene ring, a 1,3-dioxolane ring, and a polycyclic fragment. Each of G, G$_1$, G$_3$, G$_4$, G$_5$ and G$_6$ is selected from a group of a single bond, an —O— atom, a —S— atom, a ketone group, an ester group, a —C(O)CH$_2$COO— group, an azo-group, an ethylene group, an acetylenene group, a —CX$_2$CH$_2$COO— group, where X is a H or halogen atom, a —(CH$_2$)$_n$— group, and a —(OCH$_2$)$_n$— group, where n is greater than or equal to 1 and smaller than or equal to 11. Each of W$_1$ and W$_2$ is selected from one of n-alkyl, alkenyl, and branched alkyl including chiral groups. Each of E and E$_3$ is selected from one of n-alkylene, alkenylene, and branched alkylene including chiral groups. Each of X and X$_3$ is selected from a group of a phosphonic group, a salt of the phosphonic group, a phosphate group, a salt of the phosphate group, a phosphinic group, a salt of the phosphinic group, a carboxylic group, a salt of the carboxylic group, a sulfonic group, a salt of the sulfonic group, a sulfinic group, a salt of the sulfinic group, a thiol group, an amino group, a nitro group, a hydroxyl group, a —Si(OH)$_3$ group, an —OSi(OH)$_3$ group, a —CH(P(O)(OH)$_2$)$_2$ group, a —CH(OP(O)(OH)$_2$)$_2$ group, a —CH(PH(O)OH)$_2$ group, a —CH(C(OH)$_2$ group, a —CH(SH)$_2$ group, a —CH(NH$_2$)$_2$ group, a —CH(OH)$_2$ group, a —CH(Si(OH)$_3$)$_2$ group, a —CH(OSi(OH)$_3$)$_2$ group, a —CH(S(O)$_2$OH)$_2$ group, and a —CH(S(O)OH)$_2$ group. At least one of m and m$_3$ is greater than 0. Each of m, m$_1$, m$_2$, and m$_3$ is smaller than or equal to 20. Each of k and k$_1$ is 1 or 2.

According to a further embodiment, the surface of each of the nanoparticles may be further modified by a plurality of second ligands. The second ligand may have a structure according to a formula of W-G-(E)$_n$-X. W is selected from a group of a n-alkyl group, an alkenyl group, and a branched alkyl group including chiral groups. G is selected from a group of a single bond, an —O— atom, a —S— atom, a ketone group, an ester group, a —C(O)CH$_2$COO— group, an azo-group group, an ethylene group, an acetylenene group, a —CX$_2$CH$_2$COO— group, where X is an H or halogen atom, a —(CH$_2$)$_m$— group, and a —(OCH$_2$)$_m$— group, where m is greater than or equal to 1 and smaller than or equal to 11. E is selected from a group of n-alkylene, alkenylene, and branched alkylene including chiral groups. X is selected from a group of a phosphonic group, a salt of the phosphonic group, a phosphate group, a salt of the phosphate group, a phosphinic group, a salt of the phosphinic group, a carboxylic group, a salt of the carboxylic group, a sulfonic group, a salt of the sulfonic group, a sulfinic group, a salt of the sulfinic group, a thiol group, an amino group, a nitro group, a hydroxyl group, a —Si(OH)$_3$ group, an —OSi(OH)$_3$ group, a —CH(P(O)(OH)$_2$)$_2$ group, a —CH(OP(O)(OH)$_2$)$_2$ group, a —CH(PH(O)OH)$_2$ group, a —CH(C(O)OH)$_2$ group, a —CH(SH)$_2$ group, a —CH(NH$_2$)$_2$ group, a —CH(OH)$_2$ group, a —CH(Si(OH)$_3$)$_2$ group, a —CH(OSi(OH)$_3$)$_2$ group, a —CH(S(O)$_2$OH)$_2$ group, and a —CH(S(O)OH)$_2$ group. And n is greater than or equal to 0 and less than or equal to 20.

According to another embodiment, the second ligand may be selected from a group of propylphosphonic acid, hexylphosphonic acid, and nonylphosphonic acid. The length ratio between the spacer of the first ligand and the second ligand is greater than 1 and less or equal to 11. A molar ratio of the first ligand and the second ligand may be greater than or equal to 0.01 and less than or equal to 20.

According to another embodiment, a method of making a nanoparticle film is provided. The method may comprise modifying surfaces of a plurality of nanoparticles with a plurality of first ligands, mixing the surface-modified nanoparticles with a plurality of liquid crystal monomers, disposing the mixture of the liquid crystal monomers and the surface-modified nanoparticles on an alignment layer having an alignment direction, and drying and polymerizing the mixture of the liquid crystal monomers and the surface-modified nanoparticles. The polymerized liquid crystal monomers may have an axis of alignment along the alignment direction of the alignment layer, and each of the surface-modified nanoparticles may have a long axis aligned with the axis of the alignment of the polymerized liquid crystal monomers through the plurality of first ligands.

According to a further embodiment, the method may further comprise setting the alignment direction of the alignment layer by applying polarized light to the alignment layer. The method may further comprise disposing the mixture of the liquid crystal monomers and the surface-modified nanoparticles on the alignment layer by spin coating, inkjet printing, slot die coating, or blade coating.

According to a further embodiment, the plurality of nanoparticles in the nanoparticle film are quantum rods and the film emits polarized light in a visible spectral range when excited by blue or UV light. In some embodiments, the film of aligned luminescent nanoparticles modified with T-shape ligand is used in LED application either as an electroluminescent emitting layer or a photo luminescent down-converting layer. Due to improved charges injection and light out coupling for the aligned polarized emitters, the material shows better performance than quantum dots and non-aligned quantum rods.

BRIEF DESCRIPTION OF THE SEVERAL VIEWS OF THE DRAWINGS

FIGS. 4(a)-4(m) are schematic diagrams of ligands used for modifying a nanoparticle, according to alternative embodiments;

DETAILED DESCRIPTION

Figure 1:
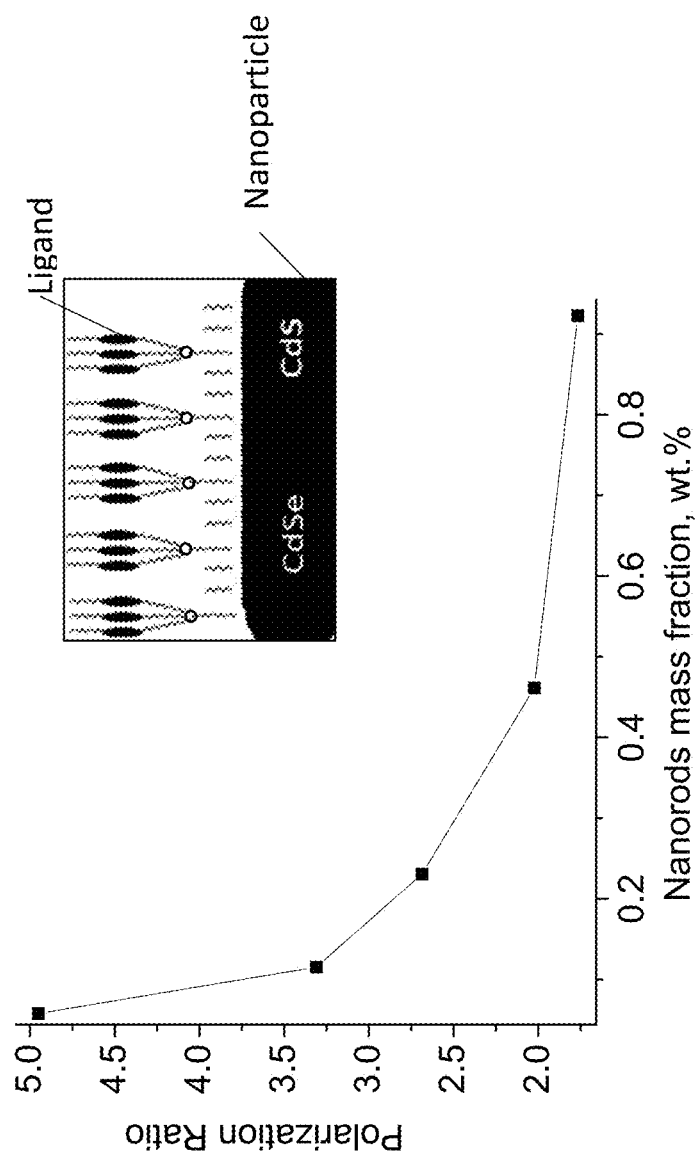
FIG. 1 shows a schematic diagram of a nanoparticle having ligands connected thereon in a perpendicular position and a polarization ratio of a resulting film according to prior art.
Figure 2:
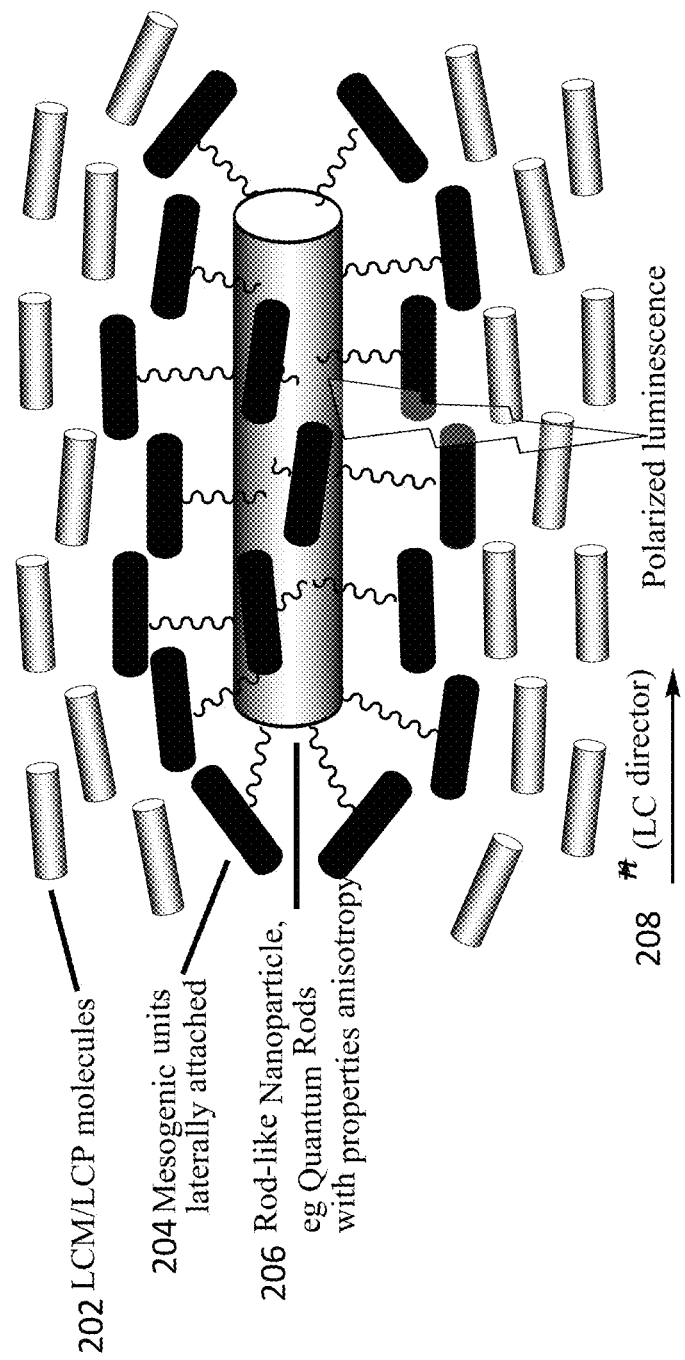
FIG. 2 is a schematic diagram of a surface-modified nanoparticle aligned with an axis (i.e., a director) of a host, according to an embodiment.

According to an embodiment, a nanoparticle ("NP") and a nanoparticle film comprising the same are disclosed. The nanoparticle film may include a plurality of the nanoparticles, such as nanorods ("NRs"), disposed in a host including organic media, such as liquid crystal polymers ("LCPs") or liquid crystal monomers ("LCMs"). In contrast with the prior-art materials, in which a long axis of the NR is perpendicular to an axis of the host, such as a director 208 of the LCM, the long axis of the NR 206 is parallel to the director 208 of the host in the nanoparticle film disclosed herein. Specifically, as shown in FIG. 2, the molecules of the LCM 202 may be aligned in parallel with the long axis of the NR 206 by means of promesogenic ligands 204 having a T shape. Both the LCM 202 and the NRs 206 may similarly respond to the aligning effect of the surface, thereby reducing or avoiding the collision between the LCM 202 and the NRs 206 caused by a mutually perpendicular alignment of the prior art.

Figure 3A:
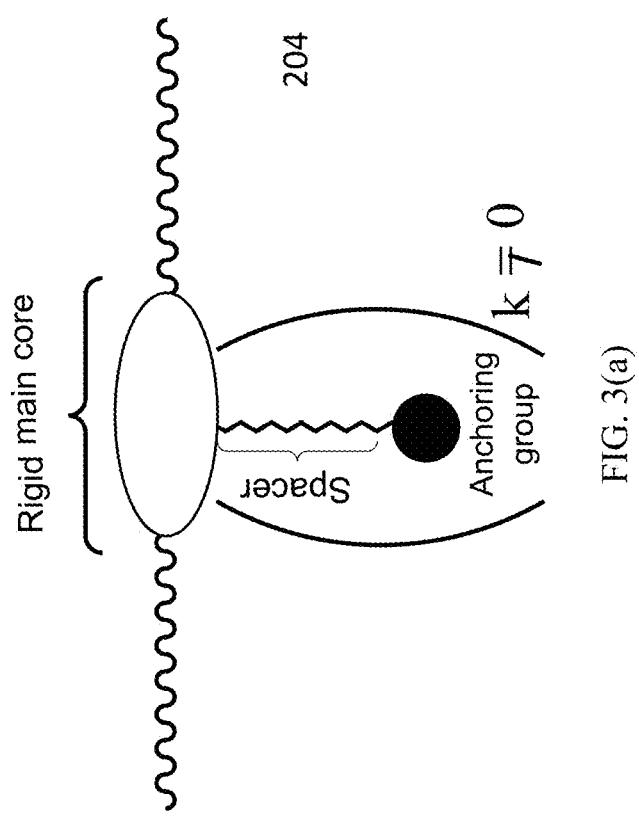
FIG. 3(a) is a schematic diagram of a ligand for modifying a surface of a nanoparticle, according to an embodiment.

According to an embodiment, to efficiently interact with surrounding organic media (e.g., the LCMs, the LCPs, etc.) and to bind to the surface of a nanoparticle, each ligand 204 disclosed herein may have at least one main rigid core connected to at least one anchoring group via a spacer, which is connected to a lateral position of the main core, resulting in a T-shaped structure, as shown in FIG. 3(a).

Figure 3B:
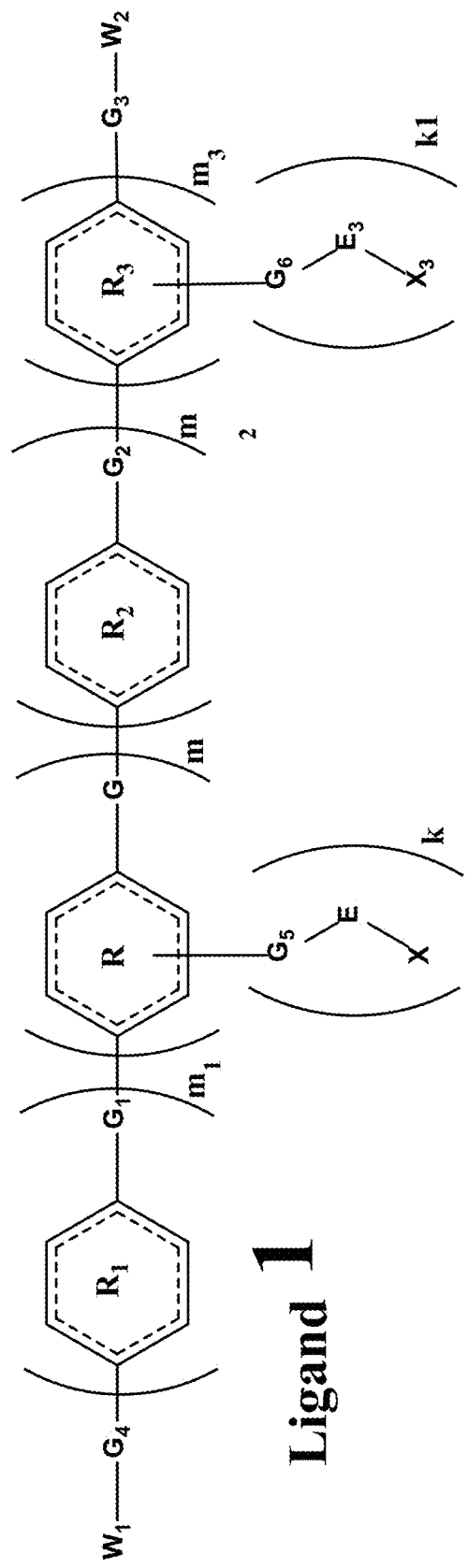
FIG. 3(b) is a schematic diagram of a molecular structure of a ligand for modifying a surface of a nanoparticle, according to an embodiment.

FIG. 3(b) depicts a general molecular structure of a T-shaped ligand (Ligand 1), similar to the ligand 204 of FIG. 2, according to another embodiment. In FIG. 3(b), each of X and $X_3$ may be an anchoring group providing a strong attachment to the surface of a nanoparticle. The Ligand 1 may have a main core having one or more core rings R. The main core of the Ligand 1 may form an elongated shape. Each of E and $E_3$ may be a flexible spacer responsible for separating the anchoring group X and $X_3$ from the main core.

The main core may have various chemical structures. In some embodiments, the main core may comprise a number of cycles of ring R, which provide rigidity to the core. The rigidity is advantageous for:
(a) maintaining the T shape of the molecule for providing the parallel alignment between the elongated main core of the ligand and the long axis of the NP (e.g., the NP 206); and
(b) efficient interactions with the structural constituents of the organic media, such as the aromatic promesogenic cores of the LCPs, the structural units of linear polymers, etc.

According to some embodiments, the main core of the Ligand 1 may have additional core rings, such as $R_1$, $R_2$, and $R_3$ coupled to the ring R, directly or indirectly. Each of R, $R_1$, $R_2$ and $R_3$ of FIG. 3(b) may be one of aromatic, heteroaromatic, 1,4-cyclohexylidene ring, 1,4-cyclohexenylidene ring, 1,3-dioxolane ring, or polycyclic fragments. Two or more of these rings may be condensed with one another. Additionally, one or more H atoms in the lateral positions of these rings may be replaced with F atoms.

In another embodiment, each of bridge groups G, $G_1$, $G_3$, $G_4$, $G_5$ and $G_6$ shown in FIG. 3(b) may be a rather short and conformationally stable connecting group providing a separation of rings R, $R_1$, $R_2$ and $R_3$ from one another, while maintaining rigidity and linearity of the main core. According to some embodiments, each of G, $G_1$, $G_3$, $G_4$, $G_5$ and $G_6$ may have a single bond, thereby connecting two neighboring fragments directly. Alternatively, each of G, $G_1$, $G_3$, $G_4$, $G_5$ and $G_6$ may have an —O— atom, an —S— atom, a ketone group (—C(O)—), an ester group (—C(O)O— or —OC(O)—), a —C(O)CH$_2$COO— group, an azo-group (—N=N—), an ethylene group (—C=C—), an acetylenene group (—C≡C—), a —CX$_2$CH$_2$COO— group, where X is an H or halogen atom, a —(CH$_2$)$_m$— or —(OCH$_2$)$_m$— group, where m is greater than or equal to 1 and smaller than or equal to 11.

In some embodiment, $W_1$ and $W_2$ of the Ligand 1 shown in FIG. 3(b) are end groups similar to those of thermotropic liquid crystals. Each of $W_1$ and $W_2$ may be n-alkyl, alkenyl, or branched alkyl including chiral groups. Each —CH$_2$— group of $W_1$ or $W_2$ may be replaced with one of a —CF$_2$—, —O—, —CH=CH—, or —C≡C— group in a way that the —O— atoms are not linked to one another directly.

In one embodiment, each of the spacers E and $E_3$ may be one of n-alkylene, alkenylene, and branched alkylene including chiral groups, where each —CH$_2$— group may be replaced with one of the —CF$_2$—, —O—, —CH=CH— or —C≡C— group in a way that the —O— atoms are not linked to one another directly.

According to an embodiment, each of anchoring groups X and $X_3$ may provide efficient binding of the ligand molecule to the NP surface. The structure of the anchoring group depends on the chemical composition of the NP surface. Thus, each of X and $X_3$ may be selected from a phosphonic (—P(O)(OH)$_2$), a phosphate (—OP(O)(OH)$_2$), or a phosphinic (—PH(O)OH) group or their salts providing strong anchoring to the $A^{II}B^{VI}$ type of NPs. Alternatively, each of X and $X_3$ may be selected from a carboxylic (—C(O)OH), a sulfonic (—S(O)$_2$OH), or a sulfinic (—S(O)OH) group or their salts, which may be used to bind to semiconductor materials as well as to different kinds of metal oxide surfaces. Still alternatively, each of X and $X_3$ may be a thiol (—SH) group, which is known to have strong anchoring to NPs of noble metal and also to the $A^{II}B^{VI}$ and $A^{III}B^V$ surface. Still alternatively, each of X and $X_3$ may be selected from an amino (—NH$_2$), a nitro (—NO$_2$), and a hydroxyl (—OH) group, which may form weaker binding to the NP surface but may be suitable for some applications. Still alternatively, each of X and $X_3$ may be selected from a —Si(OH)$_3$ or —OSi(OH)$_3$ group, which may be efficiently used for attachment to the surface of a metal oxide NP.

According to some embodiments, two anchoring groups X may be attached to the spacer E, thus, resulting in one of CH(P(O)(OH)$_2$)$_2$, —CH(OP(O)(OH)$_2$)$_2$, —CH(PH(OH)$_2$, —CH(C(O)OH)$_2$, —CH(SH)$_2$, —CH(NH$_2$)$_2$, —CH(OH)$_2$, —CH(Si(OH)$_3$)$_2$, —CH(OSi(OH)$_3$)$_2$, —CH(S(O)$_2$OH)$_2$, or —CH(S(O)OH) terminal groups.

Each of m, $m_1$, $m_2$, $m_3$ of the Ligand 1 shown in FIG. 3(b) may be varied in different embodiments. However, at least one ring R comprising an anchoring group X attached to the spacer E must be present in the molecular structure of the Ligand 1.

According to another embodiment, one core ring R may comprise two spacers E, each containing a respective anchoring group X.

FIGS. 4(a)-4(m) are schematic representations of additional embodiments of the T-shape ligand and their molecular structures. In particular, FIGS. 4(a)-4(d) are schematic representations of T-shaped ligands each having one rigid main core and one anchoring group. FIGS. 4(e)-4(i) are schematic representations of T-shaped ligands each having one rigid main core and more than one anchoring group. The anchoring groups may be connected to the same ring of the main core or to different rings of the main core.

Figure 4L:
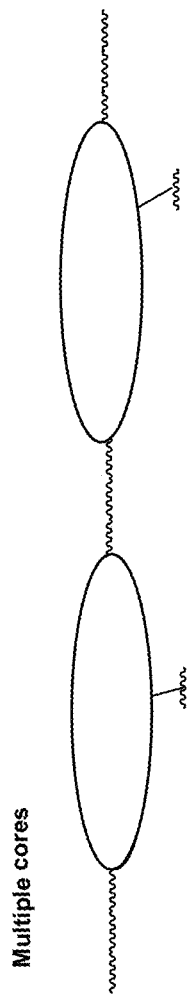
Figure 4M:
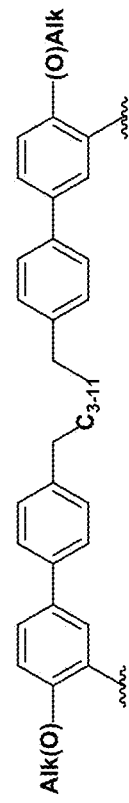
Figure 4J:
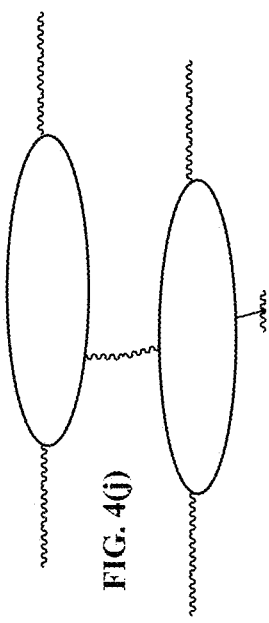
Figure 4K:
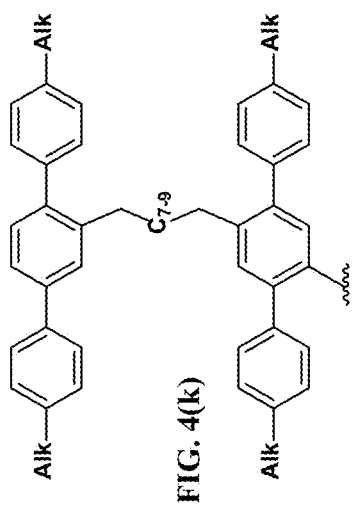

As further showed in FIGS. 4(j)-4(m), a T-shaped ligand may have two or more main cores connected to each other through a spacer. The connection between the main cores may be along the long axis of the main core. Alternatively, the connection between the main cores may also be perpendicular to the long axis of the main core, hence, resulting in a multi-level architecture as shown in FIGS. 4(j) and 4(k).

As shown in FIGS. 4(a)-4(m), the lateral attachment of the anchoring group to the rigid main core of the ligand, when coupled to the surface of a nanoparticle, causes the rigid main core of the ligand to be aligned in parallel with the surface of the nanoparticle, thereby, aligning the elongated nanoparticle with the long axis or the optical axis or the easy axis of a structurally anisotropic organic media.

According to an embodiment, the T-shaped ligands may induce liquid crystal properties to the elongated nanoparticle when the surface of the nanoparticle is covered with the T-shaped ligands. Thus, alignment techniques typically available for liquid crystals may be applicable to alignment of the resulted nanoparticles. For example, the same techniques may also be applicable to concentrated solutions (≥5 wt. %) of nanorods in isotropic organic solvent. For example, the concentration of the nanoparticles (e.g., nanorods) in the solution may be between 5 wt. % and 35 wt. %.

The molecules of the T-shaped ligand may be in certain steric conditions when attached to the surface of a nanoparticle due to the spontaneous alignment on the NP surface of the ligands. Use of a single type of T-shaped ligand, depending on the structure, may result in too much surface density of the ligand and a spontaneous vertical alignment because of thermodynamically stable packing. It is shown in Prodanov, M. F., et al., "Thermodynamically Stable Dispersions of Quantum Dots in a Nematic Liquid Crystal" *Langmuir*, 29:9301-9309 (2013), which is incorporated herein by reference, that combination of a promesogenic ligand with a short linear aliphatic ligand may control the density of the promesogenic ligand when applied to the surface of a nanoparticle, thereby adjusting the steric freedom and the interaction with surrounding media.

Figure 5:
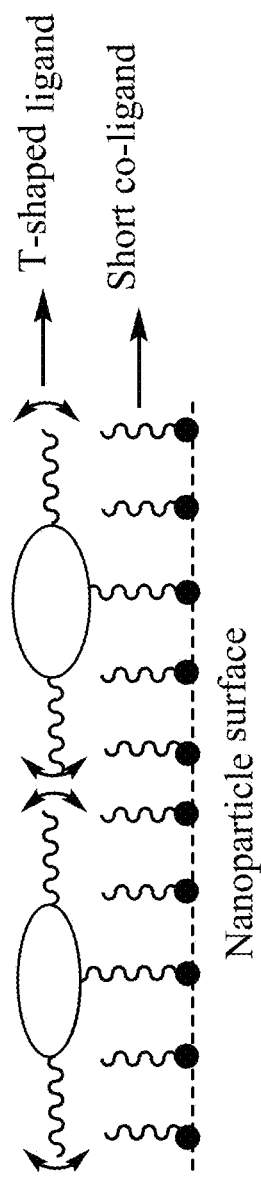
FIG. 5 is a schematic diagram of modifying a nanoparticle using a combination of T-shaped ligands and short co-ligands, according to an embodiment.

In some embodiments as shown in FIG. 5, a combination of the T-shaped ligands and short co-ligands may be applied to the NP surface. Accordingly, freedom may be reserved to the T-shaped ligands, which may be kept parallel with the NP surface and may interact efficiently with the surrounding media. At the same time, significant deviation of the main cores of the T-shaped ligands from the parallel alignment with the NP surface may be prevented as it is shown in FIG. 5.

Alternatively, in some embodiments, a combination of T-shaped ligands having different molecular structures, such as different spacers E and/or different main cores, may be applied. As a result, the main cores of the T-shaped ligands may be located at different heights above the NP surface, thereby reducing steric hindrance and optimizing steric conditions for the parallel alignment.

The T-shaped ligands or combinations of the same with short co-ligands disclosed above, may be applied to elongated nanoparticles, such as nanorods or nanoplates, of any chemical composition with corresponding anchoring groups that provide binding of the ligand molecules to a given type of material. In one embodiment, the nanoparticles of an elongated shape are made of binary compounds of general formulae $A^{II}B^{VI}$ or $A^{III}B^V$, CdSe, CdS, CdTe, ZnTe, ZnS, ZnSe, InP, GaP, InAs. In another embodiment, core-shell nanoparticles may be used, in which core and shell may each be made of binary compounds of general formulae, such as $A^{II}B^{VI}$ or $A^{III}B^V$. In still another embodiment, nanoparticles are of an alloy composition, in which two or more binary compounds of general formulae $A^{II}B^{VI}$ or $A^{II}B^V$ are constituents of the nanoparticle composition. In still another embodiment, the elongated nanoparticles may comprise perovskites, such as CsPbX$_3$ or AlkNH$_4$PbX$_3$, in which X is halogen or mixture of different halogens and Alk is an alkyl group. Alternatively, the elongated nanoparticles may include trinary compounds of general formulae $A^I B^{III} C^{VI}$, such as CuInS$_2$, AgInS$_2$, AgInSe$_2$, CuInSe$_2$, CuInGaS$_2$, etc., or noble metals (e.g., Au, Ag) nanorods.

According to a further embodiment, the elongated nanoparticles disclosed herein may emit partially polarized light and, when used in display devices, may form enhancing films, resulting in increased brightness, color saturation, and power efficiency. In particular, core-shell nanorods comprising CdSe/CdS, InP, InP/ZnS, InP/ZnSe, InP/ZnSe/ZnS, or InP/GaP/ZnS, as well as different alloyed structure comprising the above materials may be preferred.

In another embodiment, the nanoparticle of an elongated shape described herein is a ferromagnetic nanoparticle having a magnetic moment coupled with a selected axis of the elongated nanoparticle. Thus, soft magnetic materials may be formed by alignment of the ferromagnetic nanoparticles in one preferable direction. The materials of interest include, but are not limited to, Fe$_3$O$_4$, Fe$_2$O$_3$, CoFe$_2$O$_4$, or Co nanorods.

According to a further embodiment, the choice of the organic media (i.e., the host), in which elongated nanoparticles covered with the T-shaped ligands are aligned, may affect at least one of the uniformity of the resulted film, the alignment order parameter, and the ink composition for making of the film. In general, any organic media comprising structurally, and hence optically, anisotropic fragments may be used, depending on the nature of the T-shaped ligands. The T-shaped ligands may efficiently intermediate interactions between the elongated nanoparticles and the organic media, which may be anisotropic.

In one embodiment, the organic media may include liquid crystalline polymers. The liquid crystalline polymers may include LC-like (i.e., promesogenic) fragments that may be aligned by applying known techniques, such as photoalignment, rubbing, or electric field. Particularly, the liquid crystalline polymers may be aligned on a substrate by photoalignment of corresponding initial liquid crystalline monomer ("LCM") with subsequent polymerization. In a further embodiment, the LCM may be mixed with the elongated nanoparticles with surfaces modified by the ligands described herein in a proper volatile solvent. After alignment of the LCM with the elongated nanoparticles, the film is polymerized by a photo or thermal polymerization method. In an alternative embodiment, any thermo- or photo-polymer may be used as the organic media to provide alignment of their structurally anisotropic fragment in one preferred direction in the film.

According to some embodiments, a number of methods may be used to obtain the film that includes elongated nanoparticles with their long axes aligned with the optical axis/the easy axis of the structurally anisotropic organic media. For example, inkjet printing may be used to provide high quality homogeneous films and high resolution patterned covers. In general, the ink for film making may include at least two components: (a) the surface modified elongated nanoparticles described herein and (b) a precursor of the organic media. The latter may include a corresponding monomer or a solution of the constituent(s) of the final film. The monomer or the constituent(s) of the film may be in a liquid state during the film making process, otherwise proper solvent is used for all the film components to form a homogeneous solution. In alternative embodiments, the films may be formed by blade coating, spin casting, slot die, or roll printing.

In some embodiments, the elongated nanoparticles may possess partially polarized photoluminescence. Therefore, their alignment in the film by use of T-shape ligand may result in the film emitting partially polarized light. Such film, when applied in an LCD display as a brightness enhancement film, may provide an increased display brightness and color gamut.

In still another embodiment, the T-shape ligand may provide improved charge injections for the nanoparticles used in an LED emitting layer in an electroluminescent device. In a further embodiment, the luminescent elongated nanoparticles modified with the T-shape ligands may be used as a down converter on top of blue or UV LEDs and, being in-plane aligned and emitting partially polarized light, may provide a better luminous efficacy when compared to conventional phosphors or quantum dots.

Figure 7:
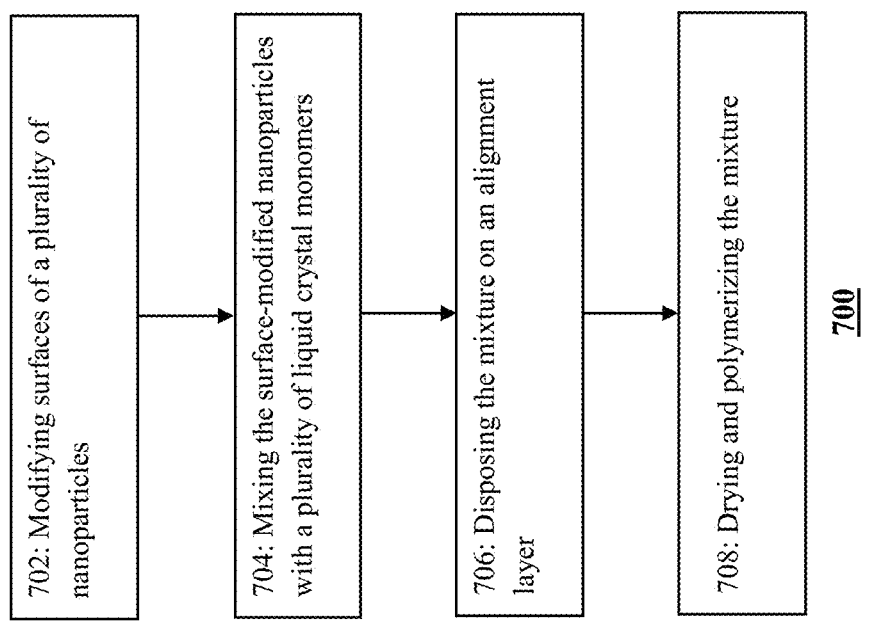
FIG. 7 is a schematic diagram of a process for making a nanoparticle film, according to an embodiment.

FIG. 7 depicts a process 700 for making a nanoparticle film according to an exemplary embodiment. According to process 700, at step 702, a plurality of nanoparticles are surface modified with a plurality of first ligands. The first ligand may be the T-shaped ligand disclosed above in connection with FIGS. 3(a), 3(b), and 4(a)-4(m). In the resulting surface-modified nanoparticles, the rigid core of each of the first ligands may be kept parallel with the surface of the nanoparticle to which the first ligand is connected.

According to a further embodiment, a plurality of second ligands (i.e., co-ligands) disclosed above may be used to further modify the surfaces of the nanoparticles. The second ligand may be shorter than the spacer of the first second so that it does not interfere with the parallel relationship between the rigid core of the first ligand and the surface of the nanoparticle.

At step 704, the surface-modified nanoparticles obtained at step 702 are mixed with a plurality of liquid crystal monomers. The mixture may be further combined with a solvent in some embodiments. The concentration of the nanoparticles in the final solution may be between 0.1 to 100 g/L.

At step 704, the solution including the mixture of the surface-modified nanoparticles and the liquid crystal monomers are disposed on an alignment layer. The alignment layer may include a substrate treated with an alignment material by, for example, spin coating. An alignment direction may be induced or imparted to the treated substrate by, for example, applying polarized light to the treated substrate.

At step 708, the solution, including the mixture of the surface-modified nanoparticles and the liquid crystal monomers, disposed on the alignment layer is dried and polymerized, resulting in a nanoparticle film. In the resulting nanoparticle film, the axis of alignment of each liquid crystal monomer is aligned along the alignment direction of the alignment layer. Further, the long axis of each of the surface-modified nanoparticles is aligned with the axis of the alignment of the liquid crystal monomers through the first ligands that are connected to the surfaces of the nanoparticles.

The following examples further illustrate exemplary embodiments of the invention but, of course, should not be construed as in any way limiting its scope.

EXAMPLE 1

Ligand Synthesis Procedure

Figure 6:
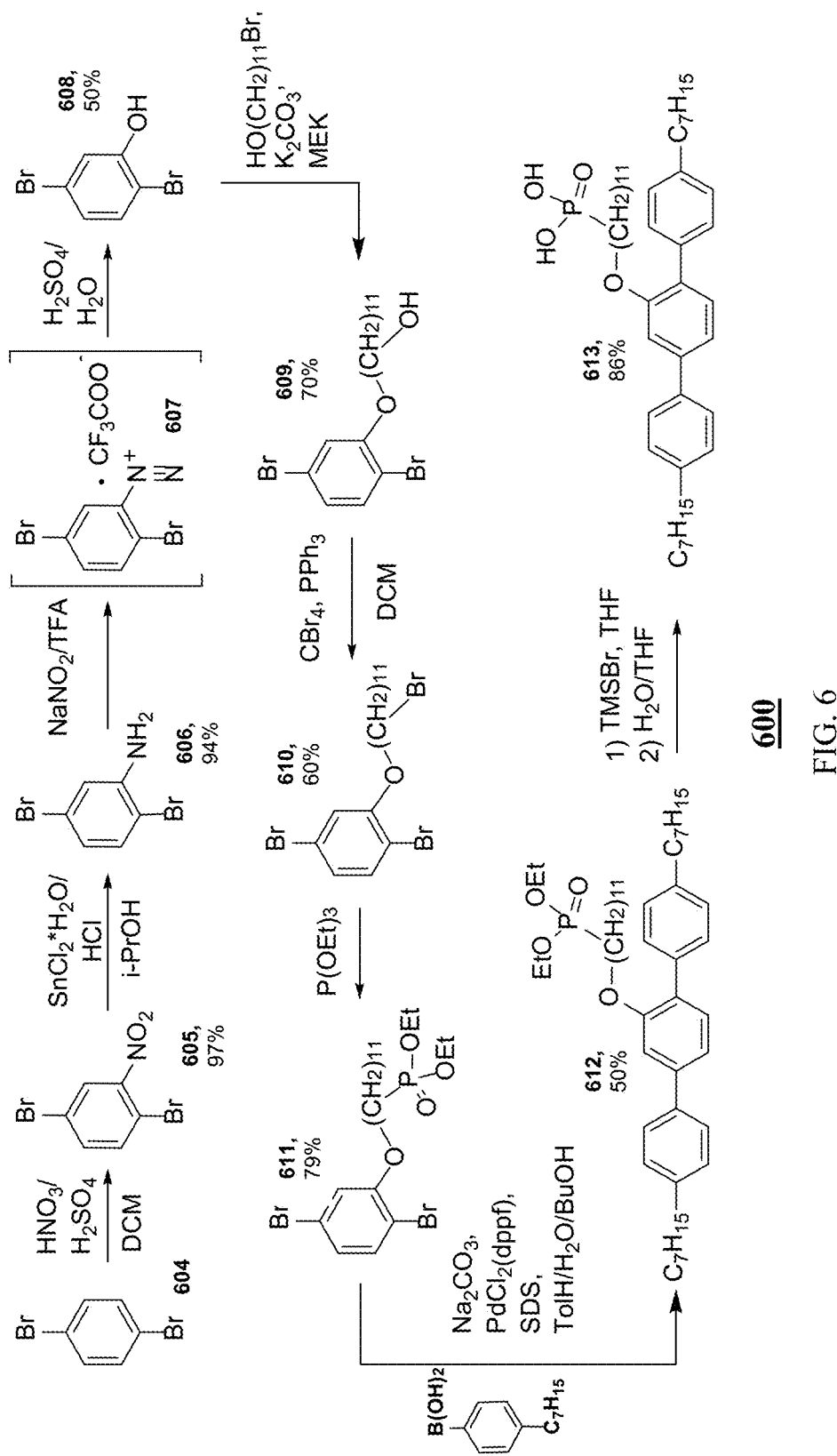
FIG. 6 is a schematic diagram of a process for synthesis of T-shaped ligands, according to an embodiment.

FIG. 6 is a schematic diagram illustrating a synthetic process 600 for obtaining the T-shaped ligand disclosed herein, which may be a promesogenic phosphonic acid 613 as shown in FIG. 6, according to an exemplary embodiment.

a. Synthesis of 2,5-dibromophenol 608

According to process 600, 2,5-dibromoaniline 606 of FIG. 6 may be obtained from dibromobenzene 604 by sequential nitration and reduction of the nitro group according to known methods, such as those described in T. Doornbos, J. Strating, "The Complete N-Alkylation of 1,4-Diamino-2,5-Dibromobenzene and of 1,4-Diamino-2,5-Dimethoxybenzene," Organic Preparations and Procedures, 4:287-303 (1969), which is incorporated herein by reference, with some minor modifications. In particular, nitration is carried out with the dropwise addition of a nitrating mixture to a solution of the dibromobenzene 604 in dichloromethane in presence of sulfuric acid at 0° C. Thus, the yield in this reaction is increased to 97%.

Sodium nitrite (5.4 g, 78 mmol) is then added to a suspension of 2,5-dibromoaniline 606 (20.00 g, 71 mmol) in trifluoroacetic acid (600 ml) at 0° C. The mixture is stirred for 30 min. After that, it is quickly transferred to a dropping funnel with a cooling coat filled with a mixture of ice-water and is added dropwise to a solution of sodium sulfate (30.00 g) in 1 L of 50% sulfuric acid under intense stirring. At the beginning of the addition, the mixture becomes green and then yellow. After the addition, the funnel is washed with ≈50 ml of trifluoroacetic acid, and the resulting mixture is refluxed for 40 minutes. After cooling the reaction mixture to the room temperature, the precipitate is filtered off, and the filtrate is distilled off (i.e., the product being distilled off with water vapor). In the resulting distillate, a white precipitate may be obtained, which is then extracted with 2 portions of dichloroethane, and the combined extracts are washed with water, dried over anhydrous sodium sulfate, and evaporated to dryness to give a colorless oil, which may subsequently crystallize.

Yield: 10.0 g, 50%.

Mass Spetroscopy Analysis (EI): m/z 252 (100%), 250 (55%), 254 (57%).

b. Synthesis of 11-(2,5-dibromophenoxy)undecan-1-ol 609

The 2,5-dibromophenol 608 (8 g, 31.7 mmol) obtained at the previous step above, 11-bromo-1-undecanol (9.1 g, 36.5 mmol), and $K_2CO_3$ (13.1 g, 95.00 mmol) are heated with stirring in 200 ml of 2-butanone for 12 hours. The reaction mixture is evaporated to dryness under reduced pressure. The residue is suspended in water, and the product is extracted with several portions of chloroform, followed by washing the extract with water three times. After evaporation of the solvents, a product is obtained which is additionally purified by flash chromatography. The resulting product is dried in vacuo at 100° C.

Yield: 9.3 g, 70%.

$^1$H NMR (200 MHz, DMSO-$d_6$): δ=1.11-1.48 (16H, m), 1.69 (2H, n, J=7.1 Hz), 2.52 (1H, s), 3.35 (2H, t, J=6.4 Hz), 4.04 (2H, t, J=6.6 Hz), 7.04 (1H, dd, J=8.4 Hz, 2.2 Hz), 7.26 (1H, d, J=2.2 Hz), 7.49 (1H, d, J=8.4 Hz).

Mass Spetroscopy Analysis (EI): m/z 422 (100%), 419 (80%), 421 (75%), 424 (50%), 423 (45%), 264 (5%), 234 (5%), 232 (5%).

c. Synthesis of 1,4-dibromo-2-((11-bromoundecyl)oxy)benzene 610

The 11-(2,5-dibromophenoxy)undecane-1-ol 609 (9 g, 21 mmol) obtained above is dissolved in 100 ml of tetrahydrofuran ("THF") and the resulting solution is degassed and filled with argon. Then, in argon, at 0° C., triphenylphosphine (11 g, 42 mmol) and tetrabromomethane (14.2 g, 42 mmol) are sequentially added. The reaction mixture is stirred at room temperature overnight, then the precipitate is filtered off, and the filtrate is evaporated to dryness. The resulting brown oil is dissolved in dichloromethane and washed three times with water. The resulting dichloromethane solution is evaporated in the presence of a small amount of silica gel, which is then transferred to a glass filter filled with silica gel. Sorbent is washed several times with benzene and then into a separate receiver-dichloromethane. The solvent from the dichloroethane fraction is evaporated to give 6 g (60%) of the product as a colorless oil.

MS (EI): m/z 484 (5%), 486 (5%), 482 (1%), 488 (1%), 252 (100%), 250 (50%), 254 (50%), 207 (15%).

d. Synthesis of diethyl (11-(2,5-dibromophenoxy)undecyl)phosphonate 611

The 1,4-dibromo-2-((11-bromoundecyl)oxy)benzene 610 (5 g, 10 mmol) obtained above is dissolved in 50 ml of triethylphosphite and heated at 125° C. overnight with stirring. The excess of triethylphosphite is distilled off in vacuum, and the residue is dissolved in a mixture of benzene. The benzene solution is passed through silica gel, which is then washed with another three times. After this, the silica gel is washed with ethyl acetate. The obtained fraction is then evaporated under reduced pressure to obtain 4.5 g (79%) of the product as a colorless oil.

MS (EI): m/z 541 (2%), 543 (1.5%), 461 (15%), 463 (15%), 291 (50%), 278 (20%), 179 (20%), 165 (75%), 152 (100%).

The product was an individual substance according to the high-pressure liquid chromatography ("HPLC").

e. Synthesis of diethyl (11-((4,4"-diheptyl-[1,1':4', 1"-terphenyl]-2'-yl)oxy)undecyl)phosphonate 612

A suspension of the diethyl (11-(2,5-dibromophenoxy)undecyl)phosphonate 611 (3.5 g, 6.5 mmol) obtained above, $Na_2CO_3$ (3.3 g, 19.5 mmol), SDS (450 mg) in 20 ml of toluene, and 10 ml of water are degassed and filled with argon three times. $PdCk_2$(dppf) (240 mg, 0.3 mmol) is then added. The reaction mixture is re-degassed with argon filling and heated to boiling. Pre-degassed solutions of 4-heptylphenylboronic acid (3.4 g, 15.6 mmol) in 20 ml of toluene and 5 ml of butanol are added to the resulting emulsifier. After three hours, the reaction mixture is allowed to cool to room temperature and left to stir at night. The organic layer is partitioned. The aqueous layer is extracted three times with toluene. The combined extract is dried with sodium sulfate, and filtered and evaporated to give a brown oil, which is then dissolved in hexane. The insoluble black precipitate is filtered off. The filtrate is evaporated to dryness and recrystallized from ethanol, yielding 250 mg of by-product of 4,4'-diheptylbiphenyl. The residue is dissolved in benzene and passed through a layer of silica gel, which is washed twice with benzene and twice with ethyl acetate. The ethyl acetate fraction is evaporated, and the resultant pale yellow oil is purified by preparative liquid chromatography with gradient eluent ethyl acetate/dichloromethane on silica.

Yield: 2.4 g (50%).

MS (EI): m/z 733 (100%), 734 (60%), 735 (25%), 606 (25%), 442 (25%), 357 (50%), 297 (95%), 263 (25%), 183 (75%), 152 (75%).

f. Synthesis of (11-((4,4"-diheptyl-[1,1':4',1"-terphenyl]2'-yl)oxy)undecyl)phosphonic acid 613

Trimethylsilyl bromide (2 g, 14 mmol, 6 eq.) is added dropwise at 0° C. to a degassed solution of diethyl (11-((4, 4"-diheptyl-[1,1':4',1"-terphenyl]-2'-yl)oxy)undecyl)phosphonate 612 (1 g, 1.4 mmol) in dry dichloromethane (30 ml), and vigorously stirred in an argon atmosphere. The reaction mixture is stirred for one hour at this temperature and then allowed to warm up to room temperature for 5 hours. The mixture is then evaporated to dryness under reduced pressure and at 40° C. Tetrahydofuran (60 ml) and water (10 ml) are added to the residue, and the resulting mixture is stirred overnight. The solvent is evaporated, and the solid residue is recrystallized from n-octane. The precipitate is dried in a vacuum at 100° C.

Yield: 800 mg (86%).

$^1$H NMR (500 MHz, CDCl$_3$): δ=0.88 (6H, br), 1.13-1.47 (32H, m), 1.53-1.85 (8H, m), 2.63 (4H, br), 3.99 (2H, v. t.), 7.15 (1H, s), 7.23 (5H, m), 7.37 (1H, d, J=7.6 Hz), 7.51 (4H, m).

$^{13}$C NMR (126 MHz, CDC13): δ=14.15, 22.08, 22.71, 26.14, 29.17, 29.24, 29.36, 29.47, 29.61, 31.54, 31.87, 35.71, 68.54, 111.33, 119.43, 126.94, 127.7, 128.49, 128.81, 129.4, 129.52, 130.22, 130.99, 135.5, 138.43, 141.42, 142.2.

$^{31}$P NMR (202 MHz, CDCl3): δ=20.49 (s).

MS (EI): m/z 676.5 (5%), 442 (100%), 443 (25%), 444 (5%), 357 (20%), 358 (5%).

EXAMPLE 2

Surface Modification Process

Red-emitting quantum rods of a dot-in-rod CdSe/CdS structure may be synthesized according to the known methods, such as those described in Carbone, L., et al. "Synthesis and Micrometer-Scale Assembly of Colloidal CdSe/CdS Nanorods Prepared by a Seeded Growth Approach," Nano Lett., 7(10):2942-50 (2007), which is incorporated herein by reference. Green-emitting quantum rods of a CdZnSe/CdZnS structure may be synthesized according to known methods disclosed in U.S. Pat. App. Pub. No. 20190312175, which is incorporated herein by reference.

For ligand exchange, the synthesized quantum rods (20 mg) are heated for 3 hours with an excess (135 μmol) of ligand mixture in 1,2,4-trichlorobenzene (1.8 ml) at 160° C. in inert atmosphere. The obtained quantum rods solution is mixed with toluene (1:1) and precipitated with methanol (2 ml). The precipitate is centrifuged and dissolved in toluene (2 ml) and then precipitated again with methanol (1 ml). The precipitate is centrifuged. The obtained nanorods precipitate is dissolved in chlorobenzene (0.8 ml) and centrifuged. The solution is decanted and used further for printing ink preparation. Concentration of the nanorods in the initial solution is determined gravimetrically after complete drying of the solution aliquot.

EXAMPLE 3

Ink Preparation and Printing of the Nanorods Film

To prepare the ink with a defined nanorods concentration, the aliquot of nanorods solution in chlorobenzene is mixed with an appropriate amount of 1,2-dichlobenzene and LCM. For example, the concentration of nanorods in the final solution can be varied from 0.1 to 100 g/L, whereas the concentration of LCM can be in the range of 1-50 wt. %. The general procedure of inkjet ink preparation is illustrated, but not limited to, using mixture of 4-(2-((4-((5-(acryloyloxy)pentyl)oxy)benzoyl)oxy)ethyl)phenyl 4-((5-(acryloyloxy)pentyl)oxy)benzoate and 4-(2-((4-(3-(acryloyloxy)propoxy)benzoyl)oxy)ethyl)phenyl 4-(3-(acryloyloxy)propoxy)benzoate (54%/46%) as a monomer, 2-cyano-2-propyldodecyltrithiocarbonate as a photoinitiator, and the nanorods described herein. The concentrations of components of inkjet inks are following: 98 mg/ml of monomer, 2 mg/ml of photoinitiator, and the concentration of nanorods is varied from 0.1 to 50 mg/ml, which may result in films with a nanorod mass fraction varing in the range of 0.1-50 wt. %. The solvent in this example is 50/50 volume ratio of chlorobenzene and dichlorobenzene.

To prepare the solution for alignment on a substrate, an alignment material is first weighted in a vial, and a solvent is added to make a particular weight concentration of the alignment material. The solution is then stirred to completely dissolve the material followed by filtration through a 0.2 μm filter. For example, an alignment material of tetrasodium 5,5'-((1E,1'E)-(2,2'-disulfonato-[1,1'-biphenyl]-4,4'-diyl)bis(diazene-2,1-diyl))-bis(2-hydroxybenzoate) is used to make a 2% weight solution in dimethylformamide under 55% humidity of controlled environment.

A substrate for inkjet printing may include glass/polymer films. To make the aligned substrate, a first substrate is put under ozone chamber for 20 min to reduce the surface energy of the substrate. Then the substrate is coated with an alignment solution using spin coater at 3000 rpm. The coated substrate is then put on the hot plate at 100° C. for 10 minutes to remove the solvent from the substrate. The coated substrate is then irradiated with the polarized light of wavelength 405 nm after cooling down the substrate with 50 mW/cm$^2$ for 30 seconds under controlled humidity of 60-65% for alignment in a preferred direction.

The prepared ink is filled in fluid reservoir by syringe attached with 0.2 μm filter and then set in the printer. The pre-aligned substrate is set on the platen for printing. The prepared ink is filled to the cartridge of the inkjet printer. To print the nanorod film by inkjet printer, a proper drop spacing may be used to avoid any gap between films or overcrowded drops and to avoid any unwanted flow to reduce non-uniformity. For example, a 60 μm drop spacing may be used for the inkjet printing. Multiple layer printing may also be used to increase the thickness and, thereby, emission from the printed film. Each layer of the film is printed after polymerization of the previous layer under the UV light of peak wavelength 365 nm in a nitrogen environment.

Figures 8A, 8B:
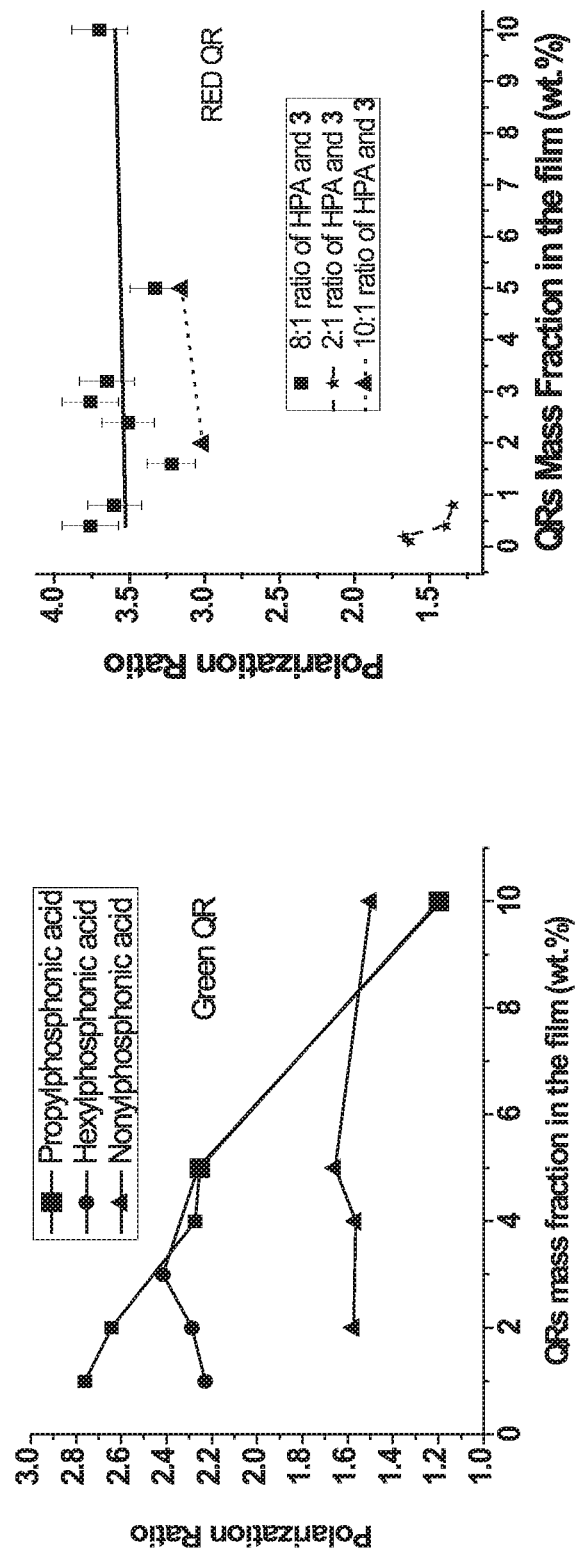
FIGS. 8(a) and 8(b) show relationships between polarization ratio and concentration of green and red quantum rods modified with the T-shaped ligands, according to some embodiments.
Figure 9A:
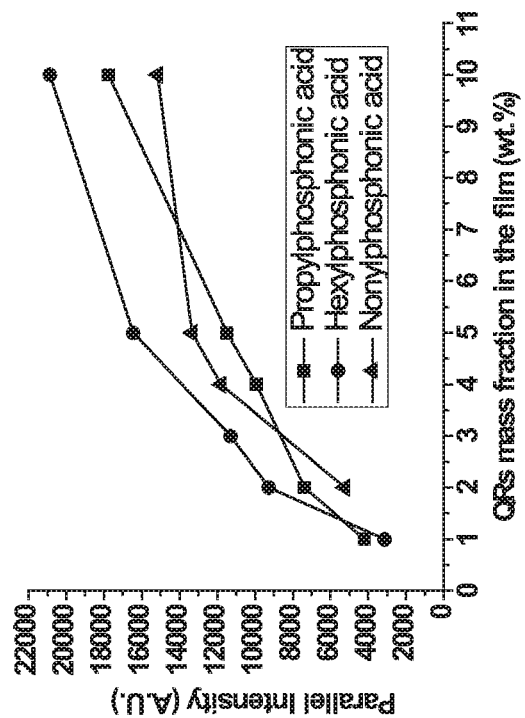
FIGS. 9(a) and 9(b) show total and parallel intensity of films having the surface-modified nanoparticles, according to some embodiments.
Figure 9B:
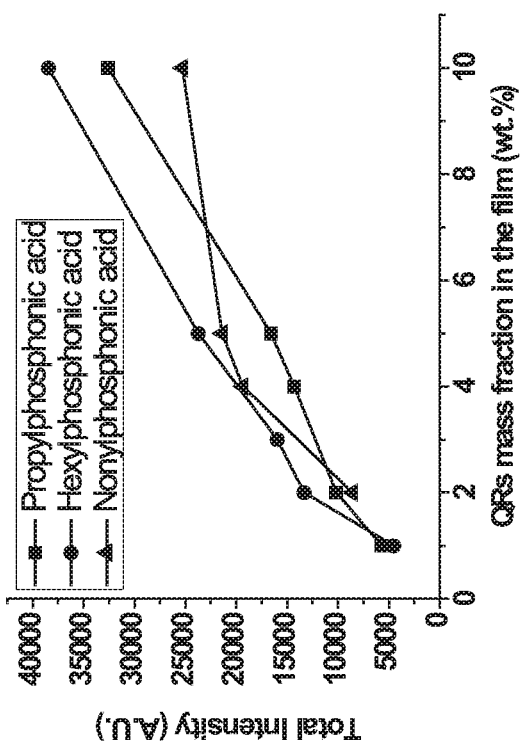

FIGS. 8(a) and 8(b) illustrate results of measurements of polarization ratio of the fabricated aligned quantum rods films for red and green quantum rods. Polarization ratio is defined as the ratio of intensities of emission ($I_\parallel/I_\perp$), where $I_\parallel$ and $I_\perp$ are emission intensities when polarizer transmission axis is parallel and perpendicular to quantum rod alignment, respectively. FIGS. 9(a) and 9(bz) further illustrate concentration dependences of the total and parallel to analyzer intensities of emission. The T-shaped ligand 613 of FIG. 6 obtained above is applied in combination with different phosphonic acids in different ratios. As shown in FIGS. 7(a)-(b) and 8(a)-(b), in an exemplary embodiment, the best performance of the fabricated QREF is achieved using hexylphosphonic acid as a co-ligand in molar ratio 1:8. This combination of ligands allows use of high concentration of quantum rods in the film (e.g. 10 wt. %) without affecting polarization ratio, resulting in high film brightness, which indicates both high order alignment and absence of nanorods aggregation with the increase of concentration.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A nanoparticle film, comprising:
   a liquid crystal polymer (LCP) host comprising a plurality of polymerized liquid crystal monomers aligned with an axis of alignment; and
   a plurality of nanoparticles disposed in the LCP host, wherein surfaces of the plurality of nanoparticles are modified by a plurality of first ligands, and wherein, based on the plurality of first ligands, long axes of the plurality of nanoparticles are aligned in parallel relative to the axis of alignment of the polymerized liquid crystal monomers of the LCP host.

2. The nanoparticle film of claim 1, wherein a concentration of the nanoparticles in the nanoparticle film is in the range of 0.5 to 50 wt. %.

3. The nanoparticle film of claim 1, wherein each of the plurality of first ligands includes:
   a main core of an elongated shape;
   a first anchoring group; and
   a spacer;
   wherein the first anchoring group is connected to a lateral position of the main core through the spacer such that the main core, the spacer and the first anchoring group form a T-shaped structure.

4. The nanoparticle film of claim 3, wherein the main core includes at least one ring.

5. The nanoparticle film of claim 4, wherein the at least one ring is selected from the group consisting of:

an aromatic ring,
a heteroaromatic ring,
a 1,4-cyclohexylidene ring,
a 1,4-cyclohexenylidene ring,
a 1,3-dioxolane ring, and
a polycyclic fragment.

6. The nanoparticle film of claim 4, wherein the at least one ring includes a plurality of rings connected in a linear structure through one or more bridge groups.

7. The nanoparticle film of claim 6, wherein each of the one or more bridge groups is selected from the group consisting of:
   an —O— atom,
   an —S— atom,
   a ketone group,
   an ester group,
   a —C(O)CH$_2$COO— group,
   an azo-group,
   an ethylene group,
   an acetylenene group,
   a —CX$_2$CH$_2$COO— group, wherein X is an H or halogen atom, and
   a —(CH$_2$)$_m$— or —(OCH$_2$)$_m$— group, wherein m is greater than or equal to 1 and smaller than or equal to 11.

8. The nanoparticle film of claim 3, wherein the spacer is selected from the group consisting of:
   n-alkylene,
   alkenylene, and
   branched alkylene including chiral groups.

9. The nanoparticle film of claim 3, wherein the first anchoring group is selected from the group consisting of:
   a phosphonic group,
   a salt of a phosphonic group,
   a phosphate group,
   a salt of a phosphate group,
   a phosphinic group,
   a salt of a phosphinic group,
   a carboxylic group,
   a salt of a carboxylic group,
   a sulfonic group,
   a salt of a sulfonic group,
   a sulfinic group,
   a salt of a sulfinic group,
   a thiol group,
   an amino group,
   a nitro group,
   a hydroxyl group,
   a Si(OH)$_3$ group, and
   an —OSi(OH)$_3$ group.

10. The nanoparticle film of claim 3, wherein each of the plurality of first ligands further comprises a second anchoring group connected to another lateral position of the main core.

11. The nanoparticle film of claim 3, wherein each of the plurality of first ligands has a structural fragment according to a formula of:

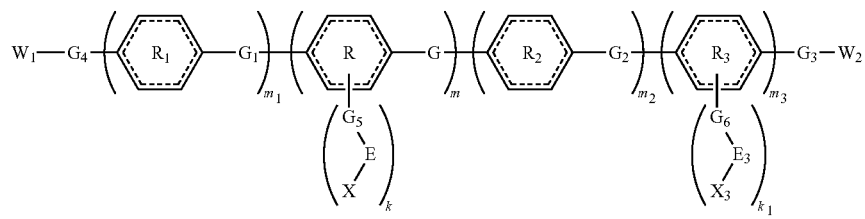

wherein: each of R, $R_1$, $R_2$ and $R_3$ is selected from the group consisting of: an aromatic ring, a heteroaromatic ring, a 1,4-cyclohexylidene ring, a 1,4-cyclohexenylidene ring, a 1,3-dioxolane ring, and a polycyclic fragment;

each of G, $G_1$, $G_3$, $G_4$, $G_5$ and $G_6$ is selected from the group consisting of: a single bond, an —O— atom, a —S— atom, a ketone group, an ester group, a —C(O)CH$_2$COO— group, an azo-group, an ethylene group, an acetylenene group, a —CX$_2$CH$_2$COO— group, wherein X is a H or halogen atom, a —(CH$_2$) group, and a —(OCH$_2$)$_n$— group, wherein n is greater than or equal to 1 and smaller than or equal to 11;

each of $W_1$ and $W_2$ is selected from the group consisting of: n-alkyl, alkenyl, and branched alkyl including chiral groups;

each of E and $E_3$ is selected from the group consisting of: n-alkylene, alkenylene, and branched alkylene including chiral groups;

each of X and $X_3$ is selected from the group consisting of: a phosphonic group, a salt of a phosphonic group, a phosphate group, a salt of a phosphate group, a phosphinic group, a salt of a phosphinic group, a carboxylic group, a salt of a carboxylic group, a sulfonic group, a salt of a sulfonic group, a sulfinic group, a salt of a sulfinic group, a thiol group, an amino group, a nitro group, a hydroxyl group, a —Si(OH)$_3$ group, an —OSi(OH)$_3$ group, a —CH(P(O)(OH)$_2$)$_2$ group, a —CH(OP(O)(OH)$_2$)$_2$ group, a —CH(PH(O)OH)$_2$ group, a —CH(C(O)OH)$_2$ group, a —CH(SH)$_2$ group, a —CH(NH$_2$)$_2$ group, a —CH(OH)$_2$ group, a —CH(Si(OH)$_3$)$_2$ group, a —CH(OSi(OH)$_3$)$_2$ group, a —CH(S(O)$_2$OH)$_2$ group, and a —CH(S(O)OH)$_2$ group;

at least one of m and $m_3$ is greater than 0;

each of m, $m_1$, $m_2$, and $m_3$ is smaller than or equal to 20; and each of k and $k_1$ is 1 or 2.

12. The nanoparticle film of claim 3, wherein the surfaces of the plurality of nanoparticles are further modified by a plurality of second ligands.

13. The nanoparticle film of claim 12, wherein each of the plurality of second ligands has a structure according to a formula of W-G-(E)$_n$-X, wherein:

W is selected from the group consisting of: an n-alkyl group, an alkenyl group, and a branched alkyl group including chiral groups;

G is selected from the group consisting of: a single bond, an —O— atom, a —S— atom, a ketone group, an ester group, a —C(O)CH$_2$COO— group, an azo-group group, an ethylene group, an acetylenene group, a —CX$_2$CH$_2$COO— group, wherein X is an H or halogen atom, a —(CH$_2$)$_m$— group, and a —(OCH$_2$)$_m$— group, wherein m is greater than or equal to 1 and smaller than or equal to 11;

E is selected from the group consisting of: n-alkylene, alkenylene, and branched alkylene including chiral groups;

X is selected from the group consisting of: a phosphonic group, a salt of a phosphonic group, a phosphate group, a salt of a phosphate group, a phosphinic group, a salt of a phosphinic group, a carboxylic group, a salt of a carboxylic group, a sulfonic group, a salt of a sulfonic group, a sulfinic group, a salt of a sulfinic group, a thiol group, an amino group, a nitro group, a hydroxyl group, a —Si(OH)$_3$ group, an —OSi(OH)$_3$ group, a —CH(P(O)(OH)$_2$)$_2$ group, a —CH(OP(O)(OH)$_2$)$_2$ group, a —CH(PH(O)OH)$_2$ group, a —CH(C(O)OH)$_2$ group, a —CH(SH)$_2$ group, a —CH(NH$_2$)$_2$ group, a —CH(OH)$_2$ group, a —CH(Si(OH)$_3$)$_2$ group, a —CH(OSi(OH)$_3$)$_2$ group, a —CH(S(O)$_2$OH)$_2$ group, and a —CH(S(O)OH)$_2$ group; and n is greater than or equal to 0 and less than or equal to 20.

14. The nanoparticle film of claim 12, wherein each of the plurality of second ligands is selected from the group consisting of:

propylphosphonic acid,
hexylphosphonic acid, and
nonylphosphonic acid.

15. The nanoparticle film of claim 12, wherein a length ratio between spacers of first and second ligands is greater than 1 and less than or equal to 11.

16. The nanoparticle film of claim 12, wherein a molar ratio between the first ligands and the second ligands is greater than or equal to 0.01 and less than or equal to 20.

17. A method of making a nanoparticle film, comprising:
modifying surfaces of a plurality of nanoparticles with a plurality of first ligands;
mixing the surface-modified nanoparticles with a plurality of liquid crystal monomers;
disposing the mixture of the liquid crystal monomers and the surface-modified nanoparticles on an alignment layer having an alignment direction; and
drying and polymerizing the mixture of the liquid crystal monomers and the surface-modified nanoparticles;
wherein the polymerized liquid crystal monomers have an axis of alignment along the alignment direction of the alignment layer, and the plurality of first ligands induce parallel alignment of long axes of the plurality of nanoparticles relative to the axis of alignment of the polymerized liquid crystal monomers.

18. The method of claim 17, further comprising:
setting the alignment direction of the alignment layer by applying polarized light to the alignment layer.

19. The method of claim 17, wherein the mixture of the liquid crystal monomers and the surface-modified nanoparticles is disposed on the alignment layer by spin coating, inkjet printing, slot die coating, or blade coating.

20. The method of claim 17, wherein each of the plurality of first ligands has a structural fragment according to a formula of:

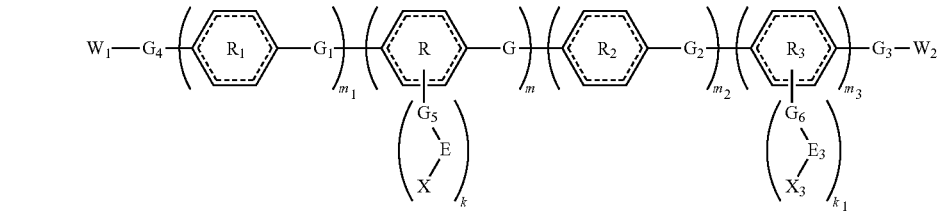

wherein:

each of R, $R_1$, $R_2$ and $R_3$ is selected from the group consisting of: an aromatic ring, a heteroaromatic ring, a 1,4-cyclohexylidene ring, a 1,4-cyclohexenylidene ring, a 1,3-dioxolane ring, and a polycyclic fragment;

each of G, $G_1$, $G_3$, $G_4$, $G_5$ and $G_6$ is selected from the group consisting of: a single bond, an —O— atom, a —S— atom, a ketone group, an ester group, a —C(O)CH$_2$COO— group, an azo-group, an ethylene group, an acetylenene group, a —CX$_2$CH$_2$COO— group, wherein X is a H or halogen atom, a —(CH$_2$)$_n$— group, and a —(OCH$_2$)$_n$— group, wherein n is greater than or equal to 1 and smaller than or equal to 11;

each of $W_1$ and $W_2$ is selected from the group consisting of: n-alkyl, alkenyl, and branched alkyl including chiral groups;

each of E and $E_3$ is selected from the group consisting of: n-alkylene, alkenylene, and branched alkylene including chiral groups;

each of X and $X_3$ is selected from the group consisting of: a phosphonic group, a salt of a phosphonic group, a phosphate group, a salt of a phosphate group, a phosphinic group, a salt of a phosphinic group, a carboxylic group, a salt of a carboxylic group, a sulfonic group, a salt of a sulfonic group, a sulfinic group, a salt of a sulfinic group, a thiol group, an amino group, a nitro group, a hydroxyl group, a —Si(OH)$_3$ group, an —OSi(OH)$_3$ group, a —CH(P(O)(OH)$_2$)$_2$ group, a —CH(OP(O)(OH)$_2$)$_2$ group, a —CH(PH(O)OH)$_2$ group, a —CH(C(O)OH)$_2$ group, a —CH(SH)$_2$ group, a —CH(NH$_2$)$_2$ group, a —CH(OH)$_2$ group, a —CH(Si(OH)$_3$)$_2$ group, a —CH(OSi(OH)$_3$)$_2$ group, a —CH(S(O)$_2$OH)$_2$ group, and a —CH(S(O)OH)$_2$ group;

at least one of m or $m_3$ is greater than 0;

each of m, $m_1$, $m_2$, and $m_3$ is smaller than or equal to 20; and each of k and $k_1$ is 1 or 2.

* * * * *